W. L. BREATH.
CARBURETER.
APPLICATION FILED SEPT. 10, 1913.
1,153,891.
Patented Sept. 21, 1915.
2 SHEETS—SHEET 1.
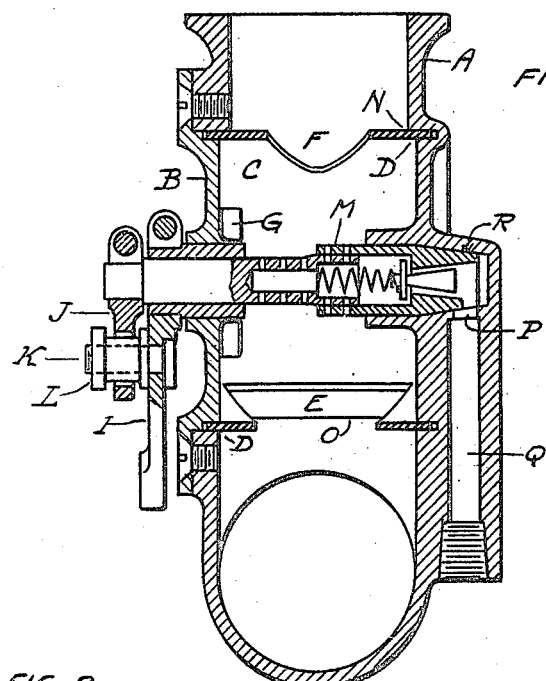
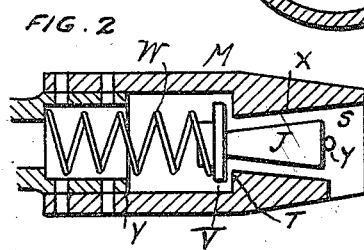
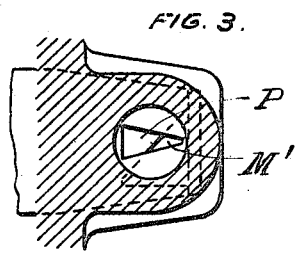
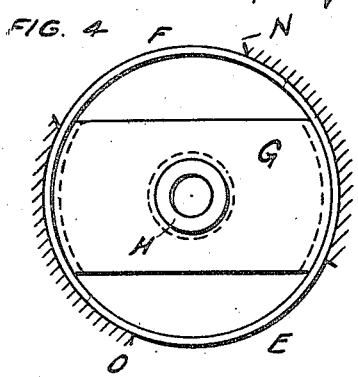
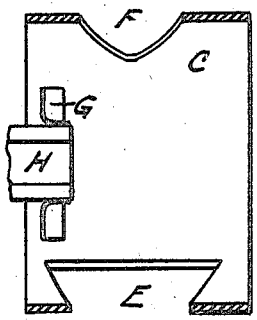

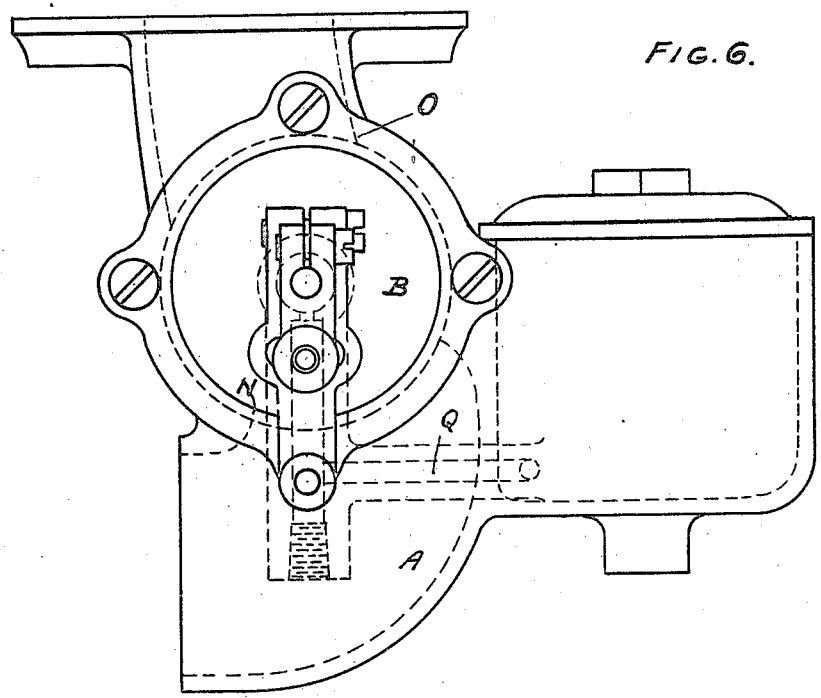

UNITED STATES PATENT OFFICE.

WILLIAM L. BREATH, OF NEW YORK, N. Y.

CARBURETER.

1,153,891.   Specification of Letters Patent.   Patented Sept. 21, 1915.

Application filed September 10, 1913. Serial No. 789,185.

*To all whom it may concern:*

Be it known that I, WILLIAM L. BREATH, a citizen of the United States, residing in the city of New York, borough of Brooklyn, and State of New York, have invented a new and useful Carbureter, of which the following is a specification.

This invention relates to a carbureter for hydro-carbon fuel, the novel features being in the construction of the throttle valve and the regulating devices for the flow of the liquid fuel into the mixing chamber.

A gas-engine develops its greatest power when using a mixture in which the proportion of hydro-carbon is relatively high to the amount of air. Such a rich mixture does not give high economy of the fuel used, and there is a further disadvantage of there being a tendency to foul the cylinders by depositing partially burned carbon. A thin or light mixture in which the proportion of the fuel is low to the amount of air is an economical mixture and shows but little tendency to deposit carbon in the cylinders, but such a mixture cannot always be used as it does not develop power enough for the greatest loads that may be put on the engine. In automobile work the engine is running on about one third of its full power most of the time and only uses its maximum for short periods, when accelerating, hill climbing or going at a high rate of speed or overcoming the resistance of a bad stretch of road. For these reasons a carbureter to be particularly desirable for automobile work should create a thin gas when the motor is running on a light road, which will automatically change to a rich powerful mixture when heavy work of any kind is put on the engine.

An engine without load will run fast and have a high suction in the manifold pipe. As work is put on the engine the effect is to reduce the speed and in consequence the suction, the reduction of speed and suction being continuous as more work is put on the engine.

This invention utilizes the suction in its varying strength to draw the hydro-carbon fluid in the interior of the throttle where it is mixed with the air, the varying strength of the suction acting on the oil causing it to flow through the duct connecting the float and mixing chambers. In this duct there are two devices, one of which is positively actuated in unison with the throttle, while the other automatically varies with the changing suction pressure. This automatic device will so affect the quality of the gas that when the engine is running under a light load the mixture will be very thin and economical, but as a heavy load is put on the motor the consequent reduction of suction in the manifold will at once so react as to change the gas to a rich powerful mixture.

Figure 1 shows a section through the throttle, oil valve and governor. Fig. 2 is an enlarged sectional view of the governor. Fig. 3 shows oil port and valve; Figs. 4 and 5 show an end and a sectional view, respectively, of the throttle. Fig. 6 is a side elevation of the carbureter.

A is the casing Fig. 6 showing a complete side view including the float chamber.

B is the throttle cover.

C is the tubular throttle, the open ends fitting into grooves in the casing and cover as shown by D.

E is the air inlet in the throttle tube and F the mixture outlet therein to the engine.

G is a bracket connecting hollow shaft H, Fig. 5, to throttle operating lever I. As I is moved back and forth the openings E and F are opened and closed in unison by passing the edges N and O, Fig. 6 of the inlet and exit openings in case A. The opening E is always larger than the opening F at all positions of the throttle, and so the suction is lower between these openings than in the manifold pipe, the relative sizes of the openings E and F giving absolute control of the suction at all times. The fuel oil is kept at a constant level in the float chamber shown in Fig. 6, from which passages Q lead to oil port P shown in Fig. 1. This oil port is a V shaped opening cut in case A into a taper reamed hole R, into which is carefully fitted valve body M. The taper end of M has an angular cut M' Fig. 3 which covers and uncovers the oil port P as it is rocked back and forth, thus enlarging and contracting the free opening at P. The valve body M is hollow and has opening S thereby allowing a passage of oil from the float to the mixing chamber.

J is a lever operating M but connected to I and H by clamping screw and nut K and L, thus the valve M is rocked back and forth by the movement of I and in unison with the throttle. The suction from the engine would thus draw air through E, the oil through P and the mixture through F, the air and oil proportions being regulated by the free openings of these ports, it being evident that these ports can be so designed as to maintain a constant mixture at all positions of the throttle. The purpose of this invention being to not keep an even mixture but to enrich when heavy work is required of the engine a further mechanism becomes necessary. Inside of valve body M is an oil port.

V is a loosely fitting piston in bore X. Against V presses a spring W. Attached to piston V is a taper, shank J' which passes through port T, the small end of shank being in port T when the spring is extended. The motion of the piston is limited by stops Y, Y. The larger end of taper J' is smaller than port T so as not to close it entirely at any time. The oil when being drawn into the mixing chamber must pass through port T and around piston V, its pressure against V causing it to move and compress the spring, the taper shank being drawn through the port T, and making the larger part of the taper effective, to close to that extent the oil port. The stronger the suction and in consequence the stronger the flow of oil the greater will the flow be restricted and in reverse as the suction becomes lighter, which it does as the engine slows down under work, the spring will force the taper governor J' back thereby enlarging the free opening of port T and allowing a more free passage for the flowing oil. This governor thus has an automatic restricting action on the flow of oil due to changing suction, its action in series with positively actuated valve at P giving the desired change of mixture for the varying conditions and great economy of fuel.

It will be seen that with a given position of the throttle the quantity of air admitted to the mixing chamber will be in direct proportion to the suction, an increase of suction affording an increased supply of air, and vice versa, whereas with the same position of the throttle the quantity of fuel drawn into the mixing chamber will be in inverse proportion to the suction, an increase in suction drawing a decreased quantity of fuel, and vice versa. The tendency of the carbureter will therefore be to automatically increase the power of the engine as the load increases and vice versa, while for ordinary loads the limited position of governor J', the tension of the spring W and the port P will provide a constant proportion of fuel and air which ordinary carbureters are supposed to afford.

Having thus described my invention I claim:

1. A carbureter provided with a mixing chamber and with oil and air passages leading thereto, means for manually controlling the flow of oil and air through said passages respectively, and means for automatically restricting the oil passage upon increase of rapidity of flow therein and enlarging the passage upon decrease of rapidity of flow therein, for the purpose set forth.

2. In a carbureting apparatus, a fuel pipe containing a graduating valve adapted to be actuated by changes in the rapidity of flow of the fuel in the pipe, the valve being moved to restrict the passage upon increase of rapidity of flow and to enlarge the passage upon decrease of rapidity of flow, in combination with a manually controlled graduating valve in said pipe, an air duct into which said pipe opens, and a manually controlled valve in said air duct.

3. In a carbureter, a throttle valve comprising an open ended tube having air and mixture openings in opposite sides, in combination with a casing having concentric circular grooves in opposite sides, in which the ends of the throttle respectively fit and turn.

WM. L. BREATH.

Witnesses:
Fred'k T. P. Simpson,
Mollie Leff.

Copies of this patent may be obtained for five cents each, by addressing the "Commissioner of Patents, Washington, D. C."